US006177867B1

(12) United States Patent
Simon et al.

(10) Patent No.: US 6,177,867 B1
(45) Date of Patent: Jan. 23, 2001

(54) SYSTEM FOR WIRELESS COMMUNICATION BETWEEN COMPONENTS OF A VEHICLE

(75) Inventors: Marc R. Simon, Whitefish Bay, WI (US); Francois Lhomme, Wolfisheim; Christophe Leligne, Wolxheim, both of (FR)

(73) Assignee: Eaton Corporation, Cleveland, OH (US)

( * ) Notice: Under 35 U.S.C. 154(b), the term of this patent shall be extended for 0 days.

(21) Appl. No.: 09/288,872

(22) Filed: Apr. 9, 1999

(51) Int. Cl.[7] .............................. B60Q 1/26; G08C 19/00

(52) U.S. Cl. ................. 340/468; 340/425.5; 340/825.69; 340/825.72; 341/176; 341/180; 455/74.1; 455/99; 701/2; 701/36

(58) Field of Search ............................... 340/468, 825.69, 340/825.72, 425.5, 539; 341/176; 455/74, 99, 74.1; 701/29, 2, 36

(56) References Cited

U.S. PATENT DOCUMENTS

| | | | |
|---|---|---|---|
| 4,067,235 | 1/1978 | Markland et al. | 73/146.5 |
| 4,157,530 | 6/1979 | Merz | 73/146.5 |
| 5,109,213 | 4/1992 | Williams | 340/447 |
| 5,113,427 * | 5/1992 | Ryoichi et al. | 340/825.44 |
| 5,157,610 * | 10/1992 | Asano et al. | 73/117.3 |
| 5,325,901 | 7/1994 | Olney et al. | 340/443 |
| 5,483,827 | 1/1996 | Kulka et al. | 73/146.5 |
| 5,717,387 * | 2/1998 | Suman et al. | 340/825.31 |
| 5,790,016 | 8/1998 | Konchin et al. | 430/448 |
| 5,815,071 * | 9/1998 | Doyl | 340/439 |

FOREIGN PATENT DOCUMENTS

| | | |
|---|---|---|
| WO 98/15964 | 10/1997 | (WO) . |
| WO 98/44470 | 2/1998 | (WO) . |

* cited by examiner

*Primary Examiner*—Donnie L. Crosland
(74) *Attorney, Agent, or Firm*—Quarles & Brady; George E. Haas

(57) ABSTRACT

A device on a motor vehicle is controlled by selecting a function for the device to perform. The selection is conveyed to a control circuit which wirelessly transmits a message using the Digital Enhanced Cordless Telecommunications protocol, wherein the message identifies the device and function. A controller receives the message and recovers the identification of the device and the function and then responds by activating the device to perform that function.

18 Claims, 2 Drawing Sheets

SYSTEM FOR WIRELESS COMMUNICATION BETWEEN COMPONENTS OF A VEHICLE

BACKGROUND OF THE INVENTION

The present invention relates to systems for controlling devices on a vehicle, and more particularly to wireless control systems.

Automobiles, trucks and trailers have numerous devices, such as lights and actuators, which are electrically operated. For example tail lights, brake lights, left and right turn signal indicators, and back-up lights are all mounted at the rear of a typical automobile. Each type of light requires that a separate power wire be run from the dashboard to control the light's operation. Similar groups of lights are mounted at the front of the vehicle which require another set of electrical wires. In addition, different actuators are located in the engine compartment and also receive control signals. In all, numerous bundles of wires run throughout the motor vehicle in order to control and operate the various devices.

It is desirable to merely run a pair of wires that form a power bus throughout the vehicle and provide a wireless mechanism for sending control signals to the individual devices. Such a mechanism must provide a technique by which several sets of controllers and devices can communicate simultaneously. In addition, wireless communication within a particular vehicle can not be interfered with by similar communications occurring in a nearby vehicle. Thus a robust communication protocol must be utilized.

Bidirectional radio frequency communication has been used for some time in cordless telephones. The term "cordless telephone" as used in the telecommunication industry, means a telephone comprising a base station and a hand-held transceiver unit. The base station is connected by wires to a terrestrial telephone line serving the owner's premises. A hand-held transceiver carried by the user communicates by radio frequency signals with the single base station that is up to approximately 300 meters away.

The Digital Enhanced Cordless Telecommunications (DECT) protocol was developed in the mid-1980's as a pan-European standard for cordless telephones and has been adapted for use outside the European Union. The DECT standard protocol has been used for simultaneous bidirectional communication between a base station and a hand-held transceiver of cordless telephones. This standard utilizes ten frequencies for communication. The exchange of signals over each frequency is divided into repetitive frames 10, each being ten milliseconds in duration and subdivided into twenty-four time slots, as shown in FIG. 1. The twelve time slots in the first half 14 of each frame are used for communication from a hand-held transceiver to the associated base station, while the twelve time slots in the second frame half 16 are used for communication from the base station and the hand-held transceiver. It should be noted that different regions of the world have implemented the DECT protocol is slightly different manners. For example, in some regions the frequencies and the number of time slots in each message frame may differ.

When a user desires to use activates the cordless telephone to make an outgoing call, the hand-held transceiver searches for a frequency that has a matching time slots in each frame half which are not being used by another cordless telephone system. This is accomplished by the hand-held transceiver listening for digital signals being sent in each time slot of the frame at each of the assigned frequencies. When a vacant pair of time slots, such as 18 and 19, is found, the hand-held transceiver sends a message initiation signal on the selected frequency during time slot 18 in the first half of a message frame.

While the hand-held transceiver is performing these functions, the base station is scanning the ten frequencies and listening during each of the twelve time slots in the first half 14 of the message frames at each frequency. When the base station hears a message initiation signal that is addressed to it, i.e. containing the proper identification data, the base station sends a response to the transceiver in the associated time slot 19 in the second half 16 of a frame at the same frequency and bidirectional communication is established. A reverse procedure occurs when the base station receives an incoming call via the terrestrial telephone line.

SUMMARY OF THE INVENTION

A general object of the present invention is to provide an system for wireless communicaton among devices on a motor vehicle.

Another object is to provide a system by which the devices on a vehicle can be operated by signals sent via a wireless communication protocol.

A further object is to make such as system immune from interference from wireless control taking place in nearby vehicles.

These and other objectives are satisfied by an apparatus which responds to an operating signal that indicates an operational state for the device. A control circuit has a transmitter which wirelessly transmits messages using the Digital Enhanced Cordless Telecommunication protocol. The messages are received by a receiver that is configured for communication using that protocol and which is part of a controller connected to the device. The controller responds by controlling the device according to the messages.

Specifically, the control circuit responds to the operating signal by transmitting a message using the Digital Enhanced Cordless Telecommunications protocol. The message includes identification of the device and an indication of the function to be performed. The controller receives the wirelessly communicated message and recovers the identification of the device and the indication of the function. The controller processes the recovered information and responds by activating the device to perform that function.

DETAILED DESCRIPTION OF THE INVENTION

Figure 2:
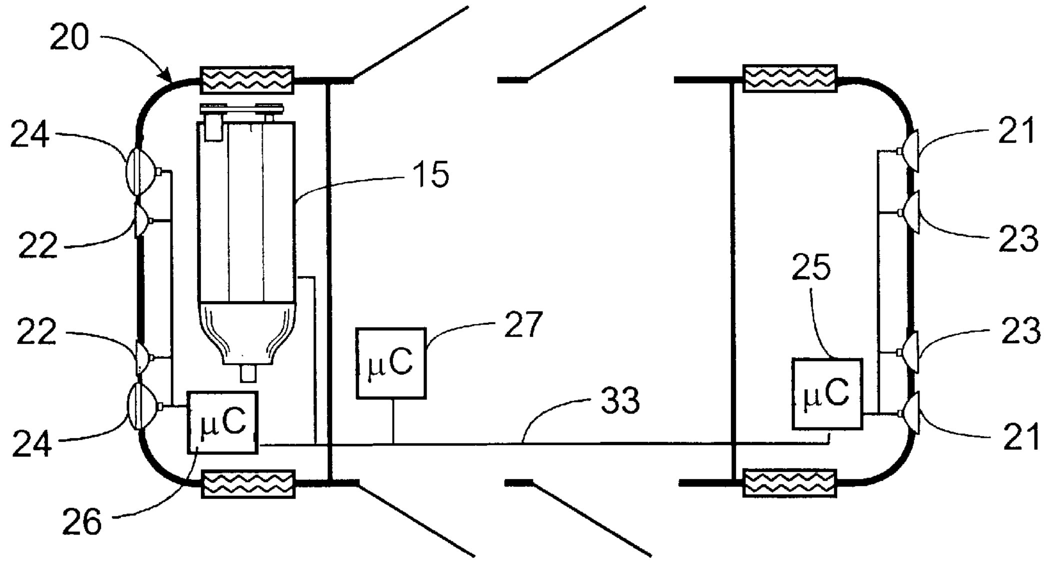
FIG. 2 is a represetnation of an automobile which incorporates the present invention.

With initial reference to FIG. 2, the present wireless control system is incorporated into a motor vehicle, such as automobile 20. The automobile 20 has brake lights 21, front and rear turn signals 22 and 23,respectively, and headlights 24. The lights 21 and 23 at the rear of the vehicle are operated by at rear controller 25 while the lights at the front are operated by a front controller 26. The controllers govern application of electricity from a power bus 33 to the individual lights in response to wireless communications received from a control circuit 27 in the dashboard, as will be described. The automobile 20 may include additional control circuits. The power bus receives electricity from an alternator on engine 15. One skilled in the art will appreciate that there can be additional control circuits located within the motor vehicle, for example one may be connected to driver operable controls on the dashboard, while another control circuit receives signals from a computer that contrils the engine.

Figure 3:
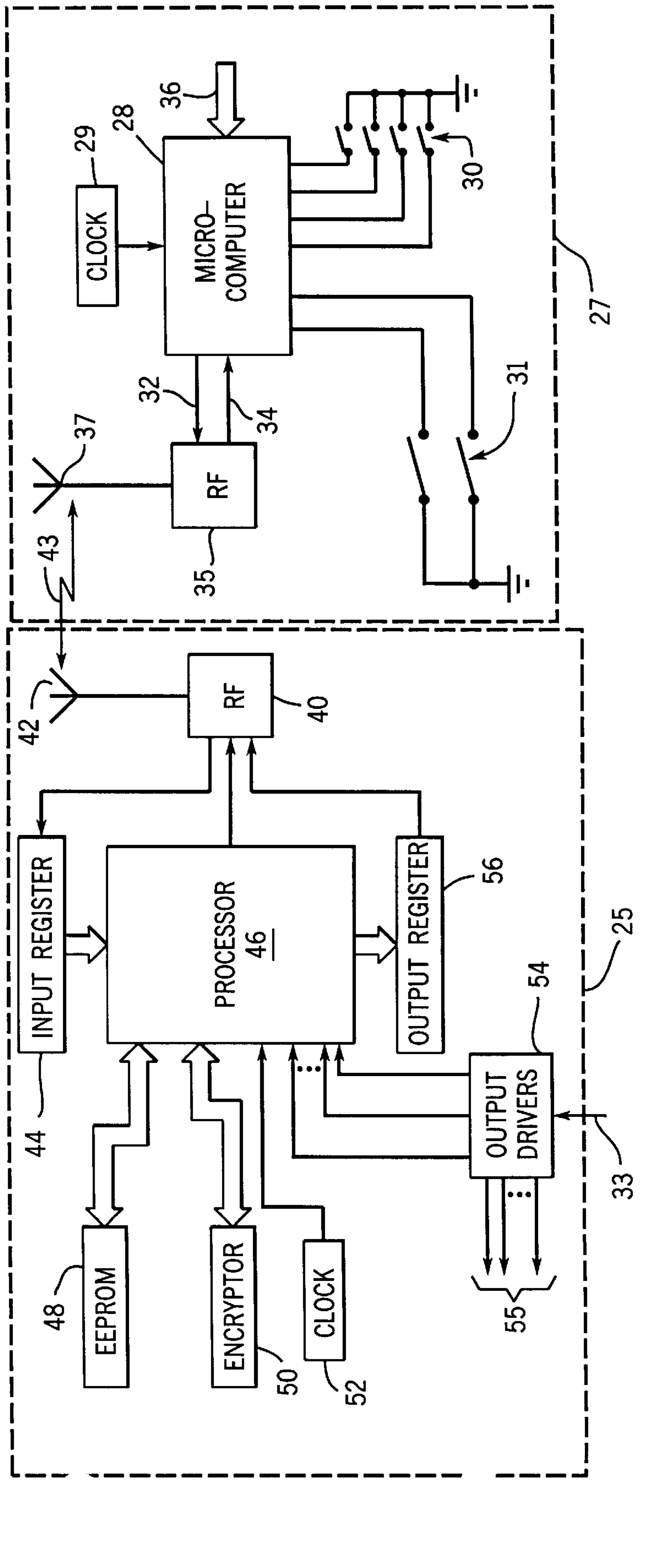
FIG. 3 is a block schematic diagram of a system for wireless control of devices on the automobile.

Referring to FIG. 3, the control circuit 27 includes a microcomputer 28 with an internal microprocessor, a memory in which the control program and data are stored, and input/output circuits. A standard clock circuit 29 supplies timing pulses to the microcomputer 28. A service technician is able to place the microcomputer into different functional modes and configurations by operating a plurality of manual switches 31.

The control circuit 27 operates numerous functions on the motor vehicle 23, such as controlling the engine 15 and operating other vehicle devices such as the lights which are controlled from the dashboard. For that functionality, the microcomputer 28 is interfaced to switches 30 that are manually operated by the driver and other control devices for activating vehicle equipment. Additional activation signals are received from other circuits in the vehicle via a parallel communication bus 36. The control circuit 27 also can send signals over the communication bus 36 to other computer systems on the motor vehicle 20.

A serial output port 32 and a serial input port 34 of the microcomputer 28 are connected to a first radio frequency transceiver 35 which utilizes the Digital Enhanced Cordless Telecommunications (DECT) protocol. In a general sense, the first radio frequency (RF) transceiver 35 contains a transmitter that modulates a standard RF frequency carrier with the serial digital data received from output port 32 and transmits that modulated radio frequency signal via an antenna 37. The first transceiver 35 also includes a receiver that demodulates radio frequency signals received by the antenna 37 to recover serial digital data carried by that signal. The recovered data is sent to the microcomputer input port 34.

The first transceiver 35 in the control circuit 27 is designed to communicate with controllers, such as rear controller 25, located throughout the automobile 20. The present invention will be described in the context of communication between control circuit 27 and rear controller 25 with an understanding that the vehilce has other control circuits and controllers which have similar structures and communication procedures.

The rear controller 25 has a second radio frequency transceiver 40 and antenna 42. As will be described, both transceivers 40 and 35 are designed to utilize the DECT protocol and are similar to devices found in cordless telephones. The second transceiver 40 has a receiver which demodulates the received radio frequency signal to recover digital data carried by that signal and the recovered data is sent in a serial format to an input register 44. The input register 44 converts the serial data stream from the second transceiver 40 into a parallel format which is read by a processor 46. The processor 46 may be a hardwired device that sequentially performs the control procedure to be described or a programmable device which executes a software program to implement that procedure. The processor 46 is connected to an electrically erasable programmable read only memory (EEPROM) 48 which stores identification data to be transmitted to the control circuit 27. A clock circuit 52 provides timing signals to the processor 46.

The rear controller 25 also includes an encryptor 50 connected to the processor 46 to encrypt a security number for transmission to control circuit 27. The encryptor 50 utilizes a secret-key cryptography algorithm to encode data for sending to the control circuit. For example the algorithm specifies a sequence of a plurality of logical operations which are performed on a known seed number and a challenge number received from the control circuit to produce a resultant number for transmission by the rear controller. Several suitable cryptography algorithms are described by Mehrdad Foroozesh in an article entitled "Protecting Your Data With Cryptography," *UNIX Review*, November 1996, volum0000e 14, number 12, page 55(6), which description is incorporated herein by reference. Such encryption techniques and algorithms are commonly used to encrypt computer data being transmitted over common carriers. It should be understood that other encryption algorithms may be used.

Digital output data is sent by the processor 46 in parallel form to a parallel-in/serial-out output register 56. The serial data from the output register 56 is applied to the input of a transmitter within the second transceiver 40 which modulates a radio frequency signal with that data. The resultant RF signal is sent via the antenna 42 to the control circuit 27. The components of the rear controller 25 are powered by a battery (not shown).

When a particular device or function on the automobile is desired to be activated, the driver closes the associated input switch 30 of the control circuit 27. The microcomputer 28 responds to this signal by formulating a message to be sent to the corresponding device throughout the vehicle that perform the selected function. For example, when the driver steps on the brake pedal, closure of the brake switch causes a message to be sent to illuminate the brake lights 21. The message contains a device identification number designating the particular device to be operated, a controller identification number for the controller associated with the particular device, and a command indicating the operation to be performed. In the present example, the device identification number designates the brakes lights and the command is to turn-on the lights.

Figure 1:
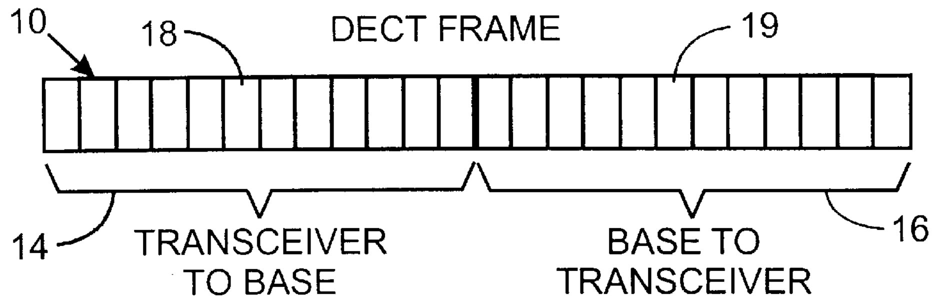
FIG. 1 PRIOR ART
FIG. 1 depicts a message frame of the Digital Enhanced Cordless Telecommunications wireless telephone protocol.

Before the message may be sent, the control circuit 27 must locate a pair of DECT frame time slots which are not already in use. This process begins by scanning each of the ten DECT frequencies. If the control circuit 27 does not hear a message frame on a given frequency, then it forms a new message frame and selects an arbitrary pair of time slots to use. If a particular frequency already is carrying DECT messages, the control circuit 27 listens during the message frames for an available pair of frame slots, one that does not already contain message data. If none is found, the control circuit 27 selects the next DECT frequency. When an available pair of time slots, such as the third time slots 18 and 19 in each half of the message frame shown in FIG. 1, is found, the control circuit 27 transmits the message in the time slot 19 during the second half 16 of the message frame. The control circuit continues to transmit the command message and listens for an acknowledgment in time slot 18 during the first half of subsequent frames. As noted previously, any of several well known data encryption algorithms may be employed to exchange data between the control circuit 27 and the rear controller 25 for greater robustness against interference.

While this is occurring, rear controller 25, as well as all of the other controllers, is scanning the ten DECT frequencies and each time slot in the second half 16 of the frames for a message signal which contains its controller identification number. When the rear controller 25 hears a message addressed to it, processor 46 responds by parsing the message into the device identification number and the command. The processor 46 then determines for which of its devices the command is intended and the action to be taken. Thus in the present example, the processor 46 applies a output control signal to the corresponding output driver 54 which switches electric current from vehicle power bus 33 to one of the output lines 55 that is connected to the brake lights 21. The processor 46 also senses whether current flows to each of the brake lights, either by sensing the cumulative current magnitude or current on individual conductors for each light. This enables the processor 46 to detect a burned-out lamp.

The processor 46 then formulates a message containing the identification numbers of the rear controller and the brake lights and an acknowledgment code indicating that the designated operation has been performed. If the rear controller is unable to perform the designated function or encounters a malfunctioning device, such as a burned-out lamp, that fact is communicated with the acknowledgement message. The acknowledgment message then is transmitted by the rear controller 25 back to the control circuit 27. The acknowledgment message is sent at the same frequency as the command signal and during a time slot (e.g. 18) in the first half of a message frame that corresponds to the time slot (e.g. 19) of the second frame half that contained the command message. Specifically, the processor sends the acknowledgment message via output register 56 to the second transceiver 40 from which it is transmitted to the dashboard control circuit 27.

Upon receiving the acknowledgment message, the control circuit's microcomputer 28 extracts the controller and device identification numbers and determines to which of possibly several command messages that are being transmitted simultaneously the acknowledgment relates. Then the control circuit terminates further transmission of the associated command message.

By employing the DECT bidirectional communication protocol, numerous control signals can be transmitted simultaneously within the vehicle using the different DECT frequencies and the different frame time slots of the each frequency. Thus the likelihood of interference among the controllers on the same vehicle is minimized. In addition, the present system reduces the possibility of interference from similar control systems on nearby vehicles. Even if another vehicle is stopped alongside automobile 20, the other vehicle will be using a different set of DECT message frame time slots and thus the two vehicle systems will be able to distinguish which messages are for its controllers. In addition, the transmission of the unique identification numbers in message to and from the rear controllers further reduces the likelihood of interference from adjacent devices and enables the control circuit to identify messages related to its components.

Each communication device, such as rear controller 25 and control circuit 27, is able to measure the amplitude of the received RF signals. That amplitude measurement is sent back in the acknowledgment signal to the communication device which transmitted the original signal. The transmitter within each transceiver 35 and 40 has the capability of varying the output power used to transmit signals. Therefore, if the amplitude measurement in the acknowledgment signal indicates that the signal at the recipient device is too weak or too strong, the transmitted can adjust the output power accordingly for subsequent transmissions. This feedback process prevents the output power from being stronger than is needed for good communication throughout the vehicle and reduces the likelihood that signals from one vehicle will be transmitted to another nearby vehicle.

What is claimed is:

1. An apparatus for controlling a device on a motor vehicle, that apparatus comprising:

a source mounted to the motor vehicle which provides an operating signal which indicates an operational state for the device;

a control circuit connected to the source and having a transmitter which responds to the operating signal by wirelessly transmitting an operational command using a Digital Enhanced Cordless Telecommunication protocol; and a controller connected to the device and having a receiver for receiving communications which use the Digital Enhanced Cordless Telecommunication protocol, wherein the controller receives the operational command from the transmitter and responds to the receiver by controlling the device according to the operational command.

2. The apparatus recited in claim 1 wherein the control circuit further comprises a first storage device for containing an identification number associated with the device; and wherein the transmitter also wirelessly transmits the identification number.

3. The apparatus as recited in claim 2 wherein the controller responds to the identification number received from the control circuit by selecting the device to be controlled.

4. A method for controlling a device on a motor vehicle, that method comprising:

an apparatus mounted to the motor vehicle selecting a function for the device to perform;

transmitting a message from a control circuit by using a Digital Enhanced Cordless Telecommunications protocol, wherein the message includes an indication of the function; and receiving, at a controller, the message sent using the Digital Enhanced Cordless Telecommunications protocol;

recovering the indication of the function from the message that was received; and the controller activating the device to perform that function.

5. The method as recited in claim 4 further comprising assigning an identifier to the device; and wherein the message that is transmitted includes the identifier.

6. The method as recited in claim 5 further comprising the controller recovering the identifier from the message that was received.

7. The method as recited in claim 6 wherein activating the device comprising selecting the device in response to the identifier recovered from the message.

8. The method as recited in claim 4 further comprising the controller responding to receiving the message by transmitting an acknowledgment message to the control circuit using the Digital Enhanced Cordless Telecommunications protocol.

9. The method as recited in claim 4 further comprising the controller responding to receiving the message by transmitting an acknowledgment message to the control circuit, wherein the acknowledgment message indicates any failure of the device.

10. The method as recited in claim 4 further comprising the controller producing an amplitude measurement of a signal carrying the message from the control circuit; and transmitting the amplitude measurement from the controller to the control circuit.

11. The method as recited in claim 10 further comprising control circuit adjusting subsequent transmission of messages in response to the amplitude measurement.

12. A method for controlling a device on a motor vehicle, that method comprising:

an apparatus mounted to the motor vehicle selecting a function for the device to perform;

searching a plurality of frequencies for one which is available to use to transmit a message;

transmitting, from a first location, a message in a time slot of a message frame at an available frequency, wherein the message includes an identifier of the device and an indication of the function; and receiving the message at a second location that is remote from the first location;

recovering the identifier of the device from the message that was received;

recovering the indication of the function from the message that was received; and responding to the identifier of the device and the indication of the function by the activating the device to perform that function.

13. The method as recited in claim 12 wherein activating the device comprising selecting the device in response to the identifier recovered from the message.

14. The method as recited in claim 12 wherein searching a plurality of frequencies comprises listening for a message frame being transmitted on each frequency.

15. The method as recited in claim 12 wherein searching a plurality of frequencies comprises listening to a message frame being transmitted on one of the plurality of frequencies for an unused time slot in the message frame.

16. The method as recited in claim 15 wherein the step of transmitting comprises transmitting the message in the unused time slot of a message frame on the one of the plurality of frequencies.

17. The method as recited in claim 16 further comprising the controller responding to receiving the message by transmitting an acknowledgment message in a time slot of a message frame on the one of the plurality of frequencies.

18. The method as recited in claim 12 further comprising the controller responding to receiving the message by transmitting an acknowledgment message in a time slot of a message frame at an available frequency.

* * * * *